United States Patent [19]
Rötgers

[11] Patent Number: 5,342,677
[45] Date of Patent: Aug. 30, 1994

[54] COMPOSITES WITH POLYETHER KETONE YARN

[75] Inventor: André Rötgers, Bobingen, Fed. Rep. of Germany

[73] Assignee: Hoechst Aktiengesellschaft, Fed. Rep. of Germany

[21] Appl. No.: 68,055

[22] Filed: May 27, 1993

[30] Foreign Application Priority Data

May 27, 1992 [DE] Fed. Rep. of Germany ....... 4217475

[51] Int. Cl.$^5$ ...................... B32B 25/02; B32B 27/02; B32B 27/28
[52] U.S. Cl. ........................ 428/222; 57/246; 57/247; 57/254; 428/229; 428/288; 428/294; 428/295; 428/902
[58] Field of Search ............... 428/222, 229, 294, 295, 428/288, 902

[56] References Cited

U.S. PATENT DOCUMENTS

| | | | |
|---|---|---|---|
| 5,225,265 | 7/1993 | Prandy et al. | 428/138 |
| 5,227,236 | 7/1993 | Handermann | 428/361 |

FOREIGN PATENT DOCUMENTS

0488071A2  6/1992  European Pat. Off. .

*Primary Examiner*—James C. Cannon
*Attorney, Agent, or Firm*—Connolly & Hutz

[57] ABSTRACT

There are described composites containing as the matrix a polymeric organic compound and as the reinforcing material polyether ketone (PEK) single, folded or cabled yarn or fabric formed from such single, folded or cabled yarn. In the composites of the invention, the polyether ketone single, folded or cabled yarn exhibits crimp.

The composites of the invention are notable for excellent adhesion between matrix material and reinforcing material.

7 Claims, No Drawings

COMPOSITES WITH POLYETHER KETONE YARN

The present invention relates to composites with polyether ketone (PEK) single, folded or cabled yarn or fabric.

As has become known from many studies carried out in recent years, one appreciable difficulty in the embedding of PEK yarn is that, compared with other reinforcing materials, such as polyamides or polyesters, only minimal adhesion can be achieved between the PEK surface and the applied matrix material. This does not change to any great extent, if at all, if the PEK yarn is additionally preimpregnated with the usual adhesion promoters based on isocyanate, epoxy or resorcinol resin. Even such pretreated yarn gives inadequate adhesion compared with polyamides or polyesters. The somewhat makeshift remedy hitherto adopted in the art is to use reinforcing constructions which, owing to their open structure, permit invasion by the matrix material and hence ensure mechanical attachment.

The reason for the lack of adhesion is the chemically very neutral character of PEK, which virtually rules out any chemical bonding.

The prior art discloses reinforcing yarns which were air jet textured and then embedded in a matrix material. The yarns in question are polyamide yarns as described in U.S. Pat. No. 3,314,897 or polyethylene terephthalate yarns as described in EP-A-319,940. In contradistinction to PEK, all these materials can also be bonded to the matrix by other methods, such as by using adhesion promoters.

It is an object of the present invention to provide a composite with PEK fiber reinforcing materials which shall be notable for excellent adhesion between the matrix material and the reinforcing material.

This object is achieved by a composite containing as the matrix a polymeric organic compound and as the reinforcing material a polyether ketone single, folded or cabled yarn or fabric formed from such single, folded or cabled yarn, wherein the polyether ketone single, folded or cabled yarn exhibits crimp.

Polyether ketone (PEK) for the purposes of the present invention is any polymer with structural units —Ar—O— and —Ar—CO—, wherein Ar is an aromatic radical. It can be for example a mono- or polycyclic aromatic hydrocarbon radical, in particular a phenylene radical. These structural units can be linked to one another in various ways, in particular para. In con, non usage, the first unit is signified as "E" (ether) and the second unit as "K" (ketone). Depending on the sequence of the ether and ketone units, it is possible to have for example PEK, PEEK, PEKK or PEEKK types. All these polymer types are encompassed by polyether ketone as used herein. Particular preference is given to using the PEEK types.

The matrix material used can be any polymeric organic material suitable for composites. This includes curable and/or thermoplastic synthetic poller materials, for example epoxy resins, curable polyester resins, melamineformaldehyde resins, resoles or novolaks or thermoplastic polyesters or thermoplastic aramids.

The matrix materials are particularly preferably elastomers, such as rubber or rubbery material.

The reinforcing material can be in the form of single, folded or cabled yarn or fabric formed therefrom, such as knitted or in particular woven fabric.

What is essential is that the PEK yarn be crimped or that the structures derived therefrom, such as folded or cabled yarn or woven fabric, contain such crimped yarn. In the case of derived structures it is sufficient for merely part of these structures to comprise crimped yarn.

In general, the PEK single yarn comprises continuous filaments. However, it is also possible to use yarns formed from crimped staple fiber.

The form of crimp is optional. The yarn can be for example gear crimped or stuffer box crimped. Preference is given to using air jet textured yarn, in particular yarn with filament loops.

The number of loops in this preferred yarn is in particular from 3 to 6 per cm of yarn length.

Particular preference is given to using folded or cabled yarn or woven fabric formed from smooth and crimped PEK single yarns. In such structures the proportion of crimped yarn is in general such that the structure suffers virtually no strength loss compared with the structure formed from smooth yarn only. In general, a proportion of less than 50% by weight of crimped yarn, based on the weight of the structure, is sufficient.

The elastomer-based composites of the invention can be used in particular as heat and chemical resistant shaped articles.

An embodiment of the invention will now be more particularly described by way of example without limiting the invention.

EXAMPLE 1

As an experiment, a proportion of the filaments required for a cabled PEK yarn of the construction (dtex $410 \times 4) \times 2$ was replaced by an air jet textured 410 dtex single yarn. This made the construction look as follows:

$$\left. \begin{array}{l} dtex\ 410\ \text{textrued} \times 1 \\ dtex\ 410\ \text{smooth} \times 3 \end{array} \right\} \times 2\ Z/S\ 300/215$$

This cabled yarn was vulcanized into a rubbery mixture without additional adhesion promoter. The adhesion obtained was compared with that of cabled yarns formed a) from 100% smooth material and b) from smooth material which had been preimpregnated with RFL (resorcinol-formaldehyde latex).

The adhesion of the cabled yarn was determined in N as per the T-test by pulling the yarn out of a rubbery article of defined size.

The adhesion of the cabled yarn having a textured content (25%) was 40% higher than that of the two other variants. The use of an adhesion-promoting mixture even gave more than double the adhesion.

The strength loss of the uncoated cabled yarn due to the use of air jet textured material (expressed in terms of the ultimate tensile strength UTS) is limited when only part of the cabled yarn comprises a textured single yarn:

| | | |
|---|---|---|
| PEK cabled | 100% smooth | UTS = 188.01 (N) |
| PEK cabled | 75% smooth | |
| | 25% text | UTS = 165.06 (N). |

The breaking extensions are not affected. They are in both cases about 24%.

What is claimed is:

1. A composite containing as the matrix a polymeric organic compound and as the reinforcing material a polyether ketone single, folded or cabled yarn or a fabric formed from such single, folded or cabled yarn, wherein the polyether ketone single, folded or cabled yarn exhibits crimp.

2. The composite of claim 1, wherein the polymeric organic matrix material is rubber.

3. The composite of claim 1, wherein the polymeric organic matrix material is a curable and/or thermoplastic synthetic resin.

4. The composite of claim 1, wherein the reinforcing material comprises stuffer box textured single yarn or is folded or cabled yarn comprising such single yarn or woven fabric comprising such single, folded or cabled yarn.

5. The composite of claim 1, wherein the reinforcing material comprises air jet textured single yarn with loops or is folded or cabled yarn comprising such single yarn or woven fabric comprising such single, folded or cabled yarn.

6. The composite of claim 5, wherein the number of loops is from 3 to 6 per cm of the yarn.

7. The composite of claim 1, wherein the reinforcing material is folded or cabled yarn comprising textured and smooth single yarns, the proportion of textured single yarn being such that there is virtually no strength loss compared with folded or cabled yarn consisting of smooth single yarn.

* * * * *